April 12, 1955  C. C. ANDREWS  2,706,046
PORTABLE AND ADJUSTABLE GRAIN SCREENER AND CONVEYOR
Filed July 27, 1953  7 Sheets-Sheet 4
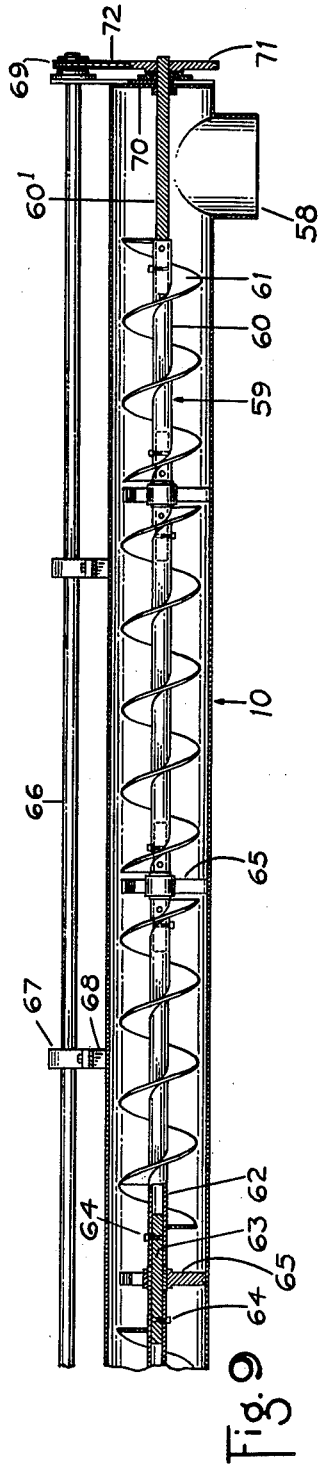
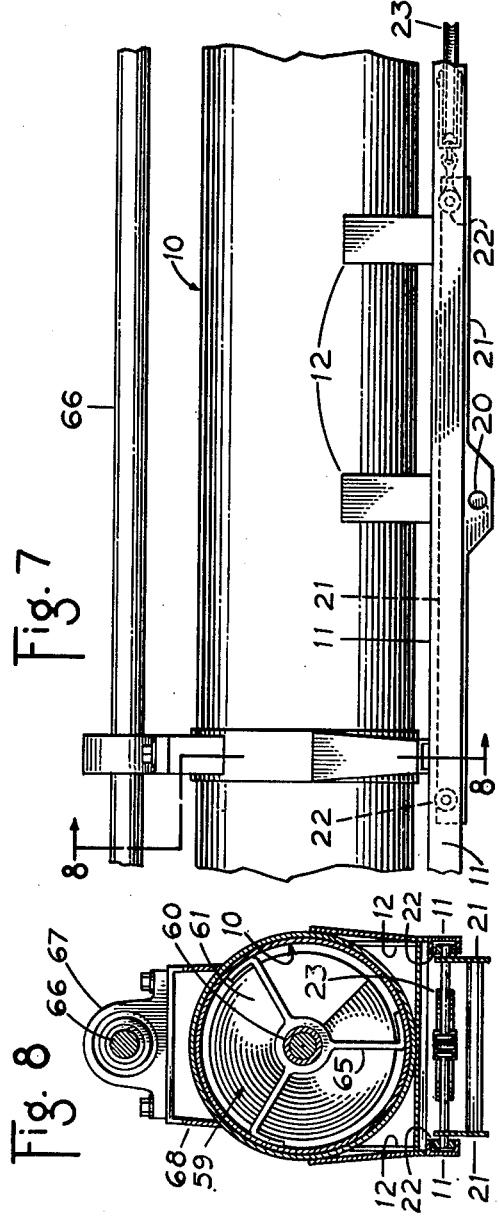
CHARLES C. ANDREWS
INVENTOR.
BY
ATTORNEY April 12, 1955  C. C. ANDREWS  2,706,046
PORTABLE AND ADJUSTABLE GRAIN SCREENER AND CONVEYOR
Filed July 27, 1953  7 Sheets-Sheet 5
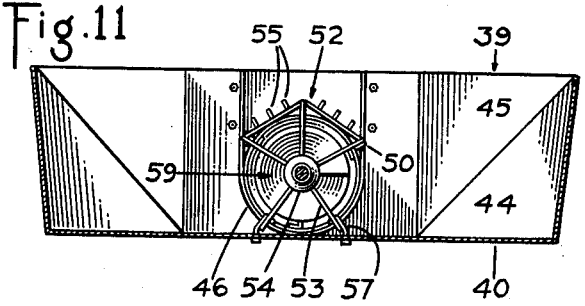
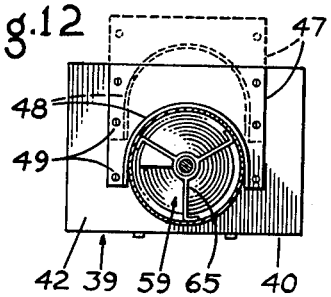
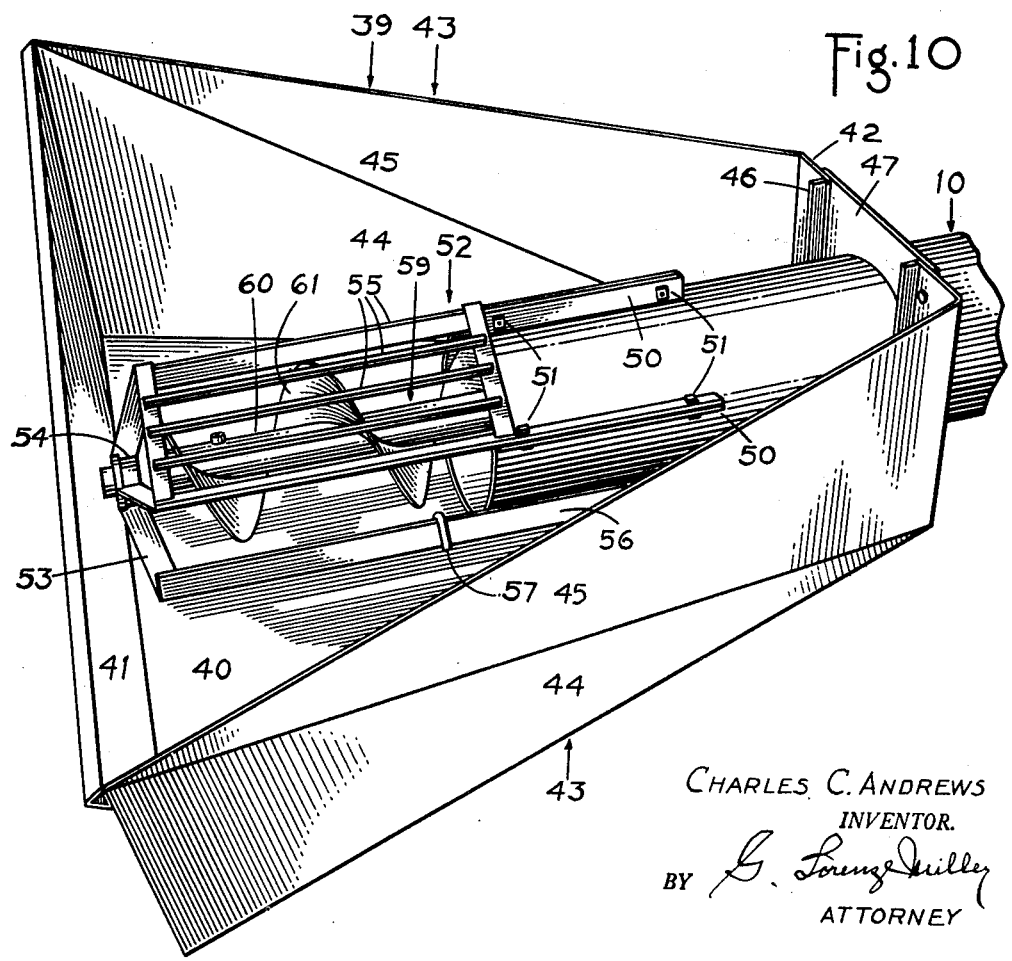
Charles C. Andrews
INVENTOR.
BY
ATTORNEY

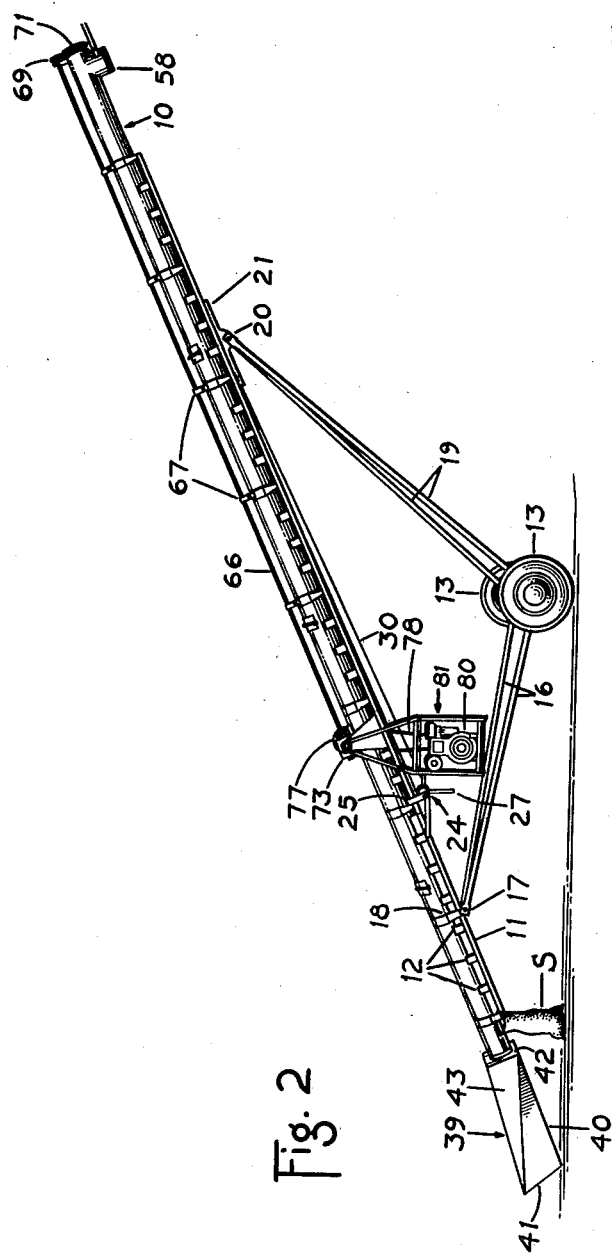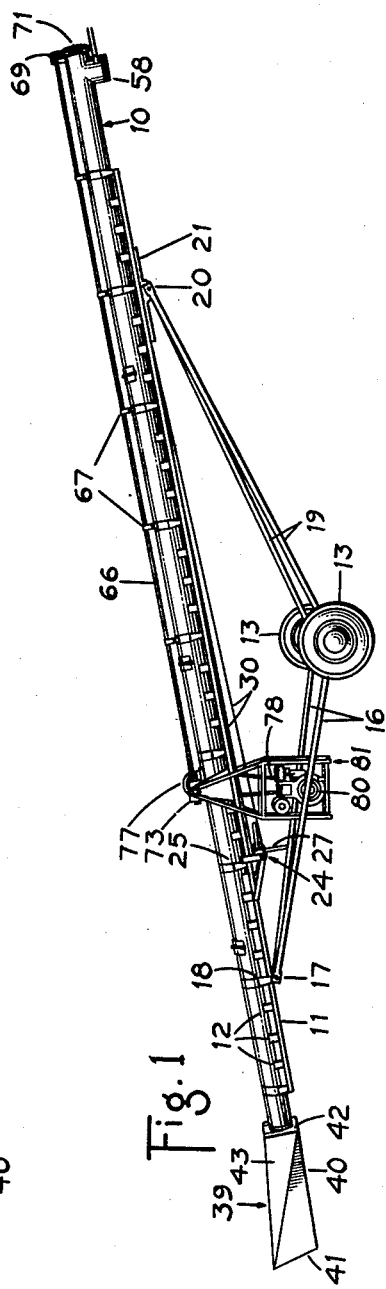

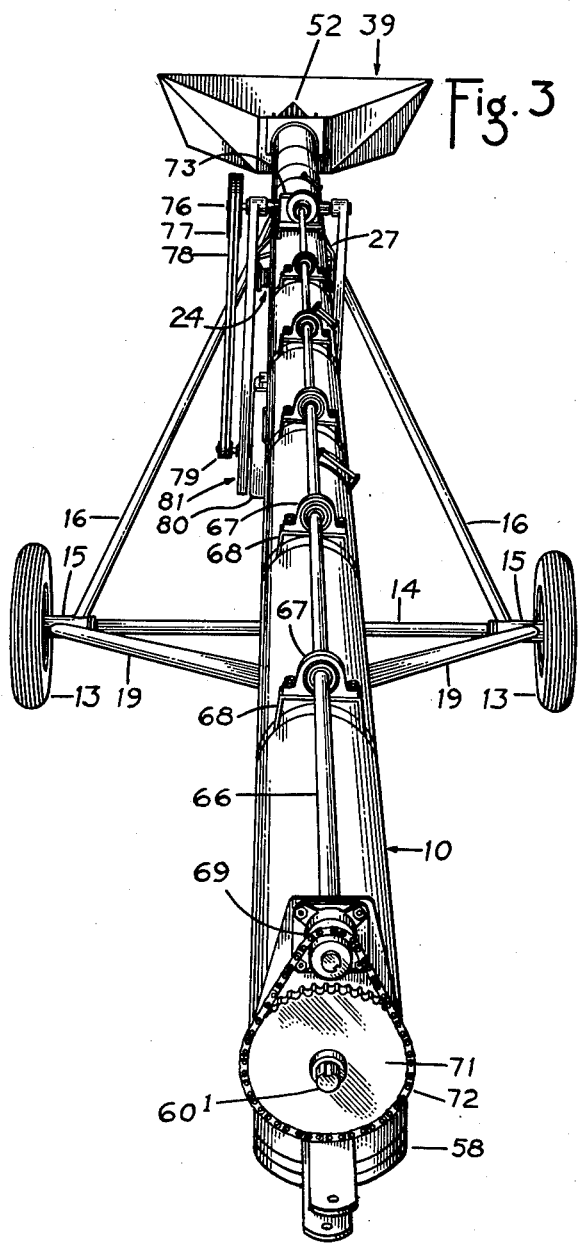

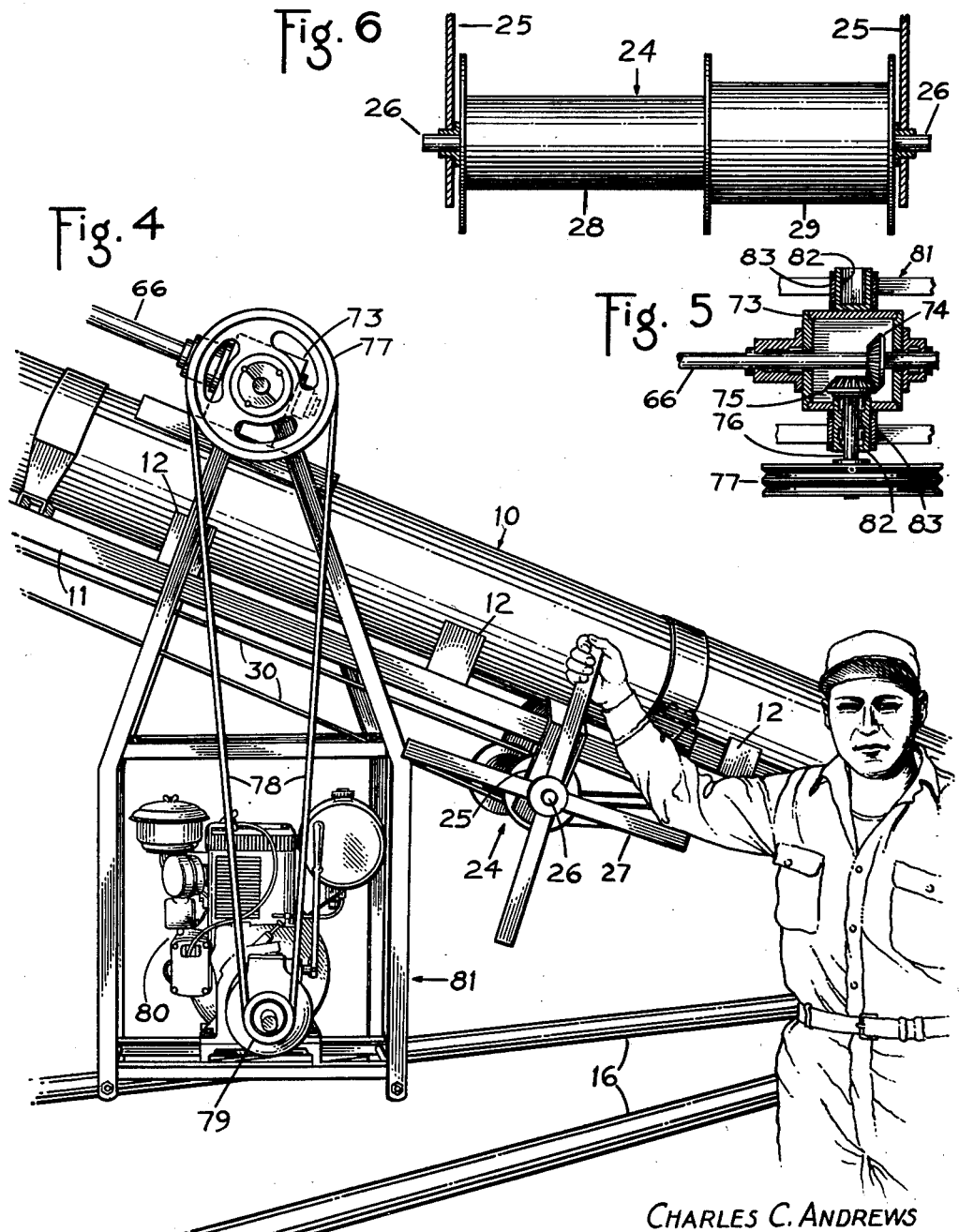

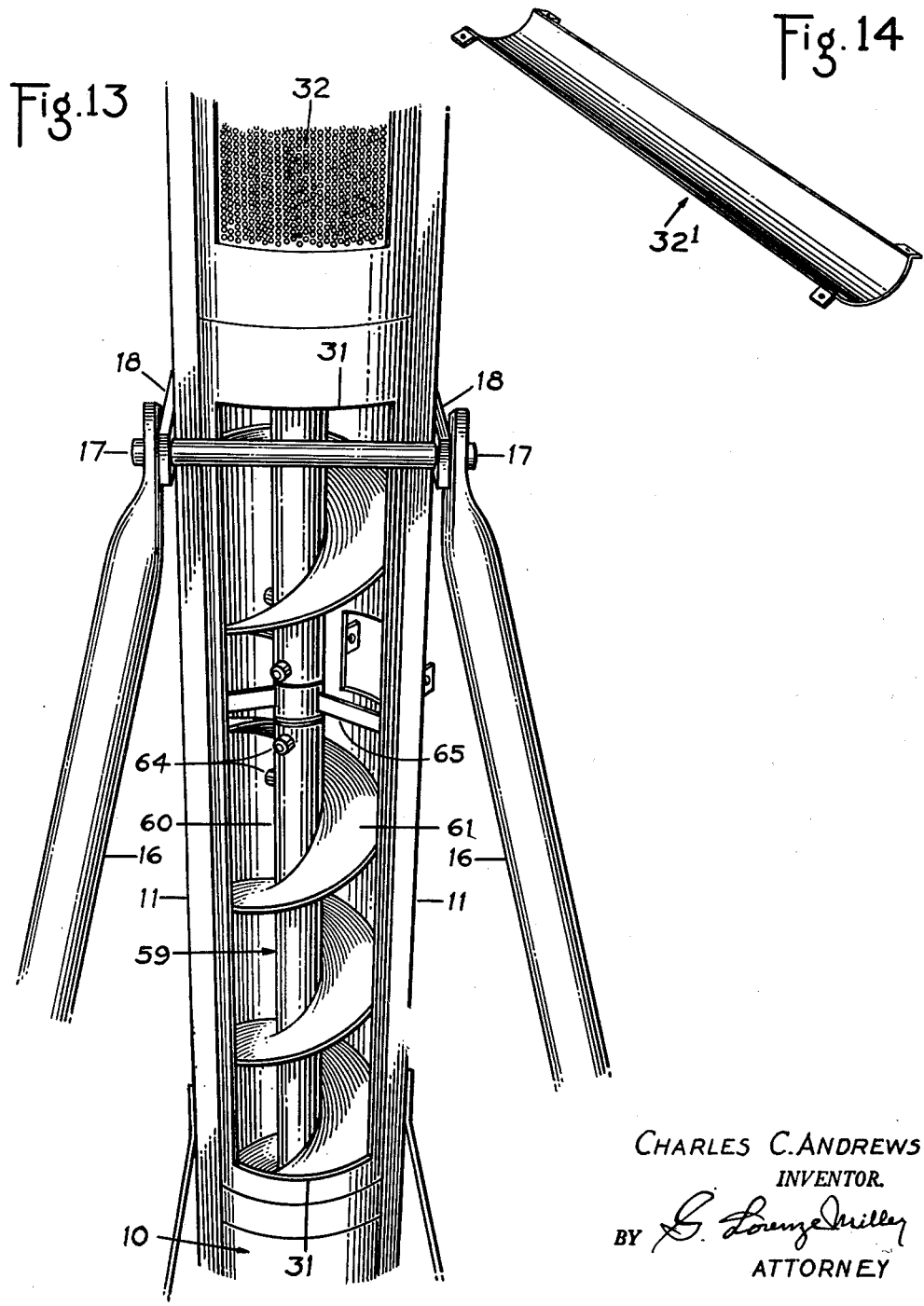

April 12, 1955
C. C. ANDREWS
2,706,046
PORTABLE AND ADJUSTABLE GRAIN SCREENER AND CONVEYOR
Filed July 27, 1953
7 Sheets-Sheet 7
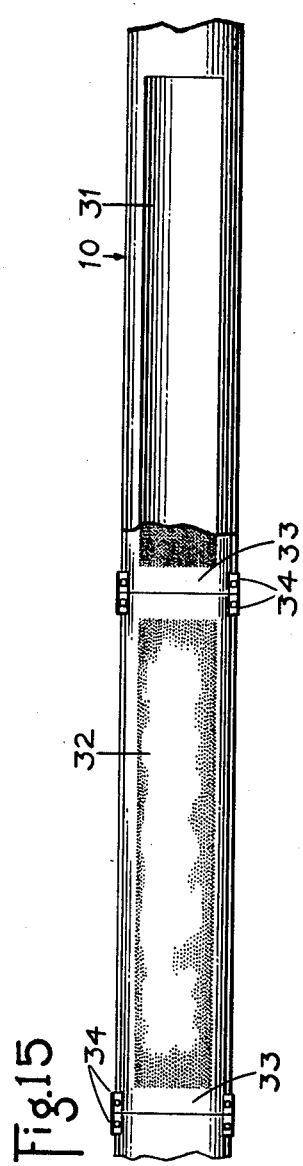
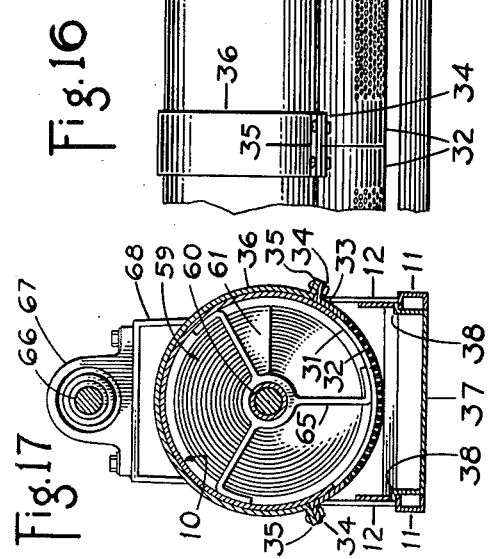
CHARLES C. ANDREWS
INVENTOR.
BY *G. Lorenz Miller*
ATTORNEY United States Patent Office 2,706,046
Patented Apr. 12, 1955

2,706,046

PORTABLE AND ADJUSTABLE GRAIN SCREENER AND CONVEYOR

Charles C. Andrews, Villa Grove, Ill.

Application July 27, 1953, Serial No. 370,427

2 Claims. (Cl. 209—283)

This invention relates to a portable and adjustable grain screener and conveyor.

While the invention is directed to an improved adjustable conveyor which is particularly adapted for use with grain, it is also adapted for use in the handling of phosphate, cement, stoker coal, and in fact any finely ground material.

A primary object of the invention is to provide a portable screw-type conveyor embodying an elongated material conducting conduit supported intermediate its ends by ground engageable wheels which are connected to the conduit by means providing for angular adjustment of the conduit for delivery of material to stations at various heights.

A further object of the invention is to provide an adjustable conveyor embodying ground engageable wheels for ready transportation of the conveyor to desired points of use and wherein the conveyor embodies an elongated material conducting conduit having a material feeding screw therein which is rotatable by a motor suspended from the conduit by a frame member having pivotal connection with the conduit.

A further object of the invention is to provide improved means for facilitating angular adjustment of the material conducting conduit relative to a horizontal together with screen means for screening material being conveyed through the conduit.

Other objects and advantages of the invention will become apparent in the course of the following detailed description, taken in connection with the accompanying drawings, wherein—

Fig. 1 is a side elevational view showing the machine in an adjusted relatively low material discharging position.

Fig. 2 is a view similar to Fig. 1 but showing the machine in an adjusted relatively high material discharging position.

Fig. 3 is a perspective view of the machine as observed from a position beyond and above the discharge end.

Fig. 4 is a substantially enlarged fragmental view partly in side elevation and partly in perspective and illustrating in particular the power screw conveyor drive means and the manually operable conduit angular adjusting means.

Fig. 5 is a sectional view substantially in the transverse axial plane of the drive shaft and illustrating in particular, the pivotal mounting of the motor supporting frame.

Fig. 6 is a view partly in elevation and partly in section showing the adjusting cable operating twin drum member.

Fig. 7 is an enlarged fragmental side elevational view showing in particular, the conduit angular adjusting means.

Fig. 8 is a transverse sectional view in the planes of broken line 8—8 on Fig. 7.

Fig. 9 is a vertical axial sectional view of the discharge end portion of the conveyor and showing in particular the drive shaft and conveyor screw mounting means.

Fig. 10 is an enlarged perspective view of the hopper end of the conveyor.

Fig. 11 is a transverse sectional view in a plane intersecting the rearmost end of the hopper unit.

Fig. 12 is an outside end view of the front face of the hopper with the conveyor conduit shown in transverse section and showing a securing plate in position in solid lines and in a partially withdrawn position in dotted lines.

Fig. 13 is an enlarged fragmental perspective view looking up from under the conveyor conduit with a screen element removed from an opening through which a portion of the conveyor is exposed.

Fig. 14 is a perspective view of a cover element adapted for use in place of the screen element when the conveyor is to be used with materials which do not require a screening operation.

Fig. 15 is a bottom view of the tubular conduit showing the screen mounting openings.

Fig. 16 is a fragmental side elevational view showing the screen element mounting means.

Fig. 17 is a transverse section showing a screen element, one of the screw bearing mounts and one of the bearings for the drive shaft.

Referring now in detail to the drawings, the improved portable conveyor comprises an elongated tube 10 which is preferably of metallic construction and through which material is adapted to be conveyed from one point to another, as e. g. grain from a thrashing machine to relatively high or low bins.

Laterally opposed inwardly facing channel members 11 are disposed beneath the tube 10 and are rigidly secured thereto as by means of plates 12 whose opposite ends are connected to the tube and channel members.

The conveying tube 10 is supported by means of a pair of ground engageable wheels 13 which are carried by opposite ends of an axle 14 whose opposite end portions extend through sleeves 15.

A pair of arms 16 have corresponding ends thereof secured to the sleeves 15 and from which the arms converge toward the feed end of the tube and their opposite ends are pivotally connected as at 17 to a strap member 18 rigidly secured to the tube.

A second pair of arms 19 have corresponding ends thereof rigidly secured to the sleeves 15 and from which the arms converge toward the discharge end of the tube. The opposite ends of the arms 19 are pivotally connected as at 20 to opposite sides of a frame including opposed side plates 21 which are supported by rollers 22 movably disposed within the channel members 11.

The purpose of the frame being longitudinally movable relative to the tube 10 is to effect angular adjustment thereof for varying the height of the discharge end of the tube as indicated in Figs. 1 and 2.

For this purpose, the end of the frame 21 is provided with a cable engageable pulley 23.

A twin drum element 24 (Figs. 4 and 6) is rotatably supported within a bracket 25 depending from the tube 10 and the shaft 26 of the drum element is provided with a suitable manually operable handle 27 (Fig. 4).

As indicated in Fig. 6 the twin drum 24 includes a cable winding cylindrical portion 28 of relatively small diameter and an axially aligned cable winding cylindrical portion 29 of relatively large diameter. The opposite ends of a cable 30 are secured to the two drum portions 28 and 29 and the intermediate portion of the cable extends about the pulley 23. Normally there are two layers of cable wound upon the smaller drum portion 28 before elevating the machines, the small drum portion being capable of holding the same amount of cable as the larger drum portion. In other words, when the smaller drum portion is all unwound, there is then the same amount of cable on the larger drum portion.

When the tube 10 is in a lowered position the power required to lift same is greater and at which time the smaller drum portion is operative and exerts greater lifting power.

Suitable means will of course be employed to lock the handle 27 in any adjusted position of the tube 10.

The tube 10 adjacent its feed end is provided with two or more openings 31 (Figs. 15, 16 and 17) in each of which is removably disposed a screen element 32 which includes a frame 33 having ears 34 at its opposite ends and which are bolted to flanges 35 on the ends of strap members 36 which engage the upper portion of tube 10 and are rigidly secured thereto.

When the conveyor is to be used with materials not requiring screening, the openings 31 are closed by covers 32¹, one of which is shown in Fig. 14.

An imperforate pan 37 is disposed beneath the screen elements and includes longitudinal shoulders 38 slidably engaged with the upper walls of the channel members 11 as is clearly shown in Fig. 17. The purpose of the pan is to direct foreign matter passed through the screen elements into a sack S or other receptacle in the manner indicated in Fig. 2.

The tube 10 is provided with a feed hopper 39 (Figs. 10, 11 and 12). The hopper 39 includes a bottom wall 40, an outwardly diverging front wall 41, a rear wall 42 and opposite side walls 43 which converge from the front wall 41 to the rear wall 42 and each side wall includes angularly related portions 44 and 45. Rigid with the rear wall 42 is a U-shaped strap 46 whose semi-circular bottom portion engages the tube 10.

The rear wall 42 includes a removable rectangular plate 47 having a semi-circular notch in its lower edge which is surrounded by a semi-circular flange 48 engageable with the upper portion of tube 10. The plate is removably bolted in position as indicated at 49 and its purpose is to removably hold the hopper in position on the adjacent end of the tube 10.

The feed end of the tube 10 extends well into the hopper 39 and such end is provided with a pair of laterally disposed longitudinally extending rigid straps 50 to which is bolted at 51 a protective frame 52 including at its forward end a spider 53 having a bearing 54 centrally thereof and including laterally spaced longitudinally extending slots 55 disposed above the screw conveyor later described. The frame further includes a pair of laterally spaced longitudinally extending bars 56, each having a hook 57 extending through the bottom wall 40 of the hopper and suitably secured thereto.

The tube 10 is provided at its discharge end with a depending cylindrical spout 58.

A conveyor screw 59 is rotatably journalled within the tube 10. The screw comprises a central shaft 60 and an encircling spiral fin 61.

As indicated in Fig. 9, the shaft 60 preferably comprises a plurality of tubular sections 62, adjacent ends of which are connected by rods 63 telescopically engaged therewithin and secured by set bolts 64.

The shaft 60 is rotatably journalled in spider members 65 adjacent the ends of the tubular sections and the spiders are rigidly secured within the tube 10.

A drive shaft 66 is rotatably supported in longitudinally spaced bearings 67 which are supported on strap members 68 encircling the tube 10. The drive shaft 66 at its outermost end is provided with a relatively small sprocket wheel 69.

The screw shaft $60^1$ extends through an outer end closing wall 70 of the tube 10 and is provided with a relatively large sprocket wheel 71 and a sprocket chain 72 is operatively engaged with the sprocket wheels 69 and 71 whereby the screw shaft $60^1$ is rotated by the drive shaft 66 at substantially reduced speed.

The other, or inner end of the drive shaft 66 extends into a housing 73 which is rigidly supported upon the tube 10 and the inner end of the shaft is provided with a bevel gear 74 in driving mesh with a corresponding bevel gear 75 fixed to the inner end of a stub shaft 76 journalled in a wall of the housing 73 and projecting therefrom. A V-belt pulley 77 is secured to the outer end of the stub shaft 76 and V-belts 78 are operatively engaged with the pulley 77 and a smaller pulley 79 driven by a motor 80 which is rigidly supported on the base of a depending frame 81.

In order that the motor be retained in the same horizontal position, regardless of the angle of inclination of the conveyor tube 10, the frame 81 is pivotally mounted on the housing 73. For this purpose the housing is provided with oppositely extending hubs 82 through one of which the stub shaft 76 extends and bearing sleeves 83 are rigidly secured to the upper end of the frame 81 and in which the hubs 82 are pivotally received.

Having set forth my invention in accordance with a preferred structural embodiment thereof, what I claim and desire to secure by U. S. Letters Patent is:

1. A conveyor structure comprising an elongated tube having a conveyor screw rotatably supported therewithin, a pair of ground wheels, means connecting said wheels with said tube including means for angular adjustment of the tube, said angular adjustment means comprising a pair of laterally spaced inwardly facing channel members disposed below said tube and rigidly secured thereto, a slidable frame disposed within said channel members, a pair of arms extending from said wheels and pivotally connected to said frame, and manually operable means comprising a drum rotatably supported beneath the tube, said drum including axially aligned cylindrical portions of different diameters, a pulley supported by said frame and a cable having opposite ends thereof respectively connected to said cylindrical portions and the intermediate portion of said cable being engaged by said pulley, a drive shaft rotatably supported on the upper wall portion of the tube, drive connections between the screw and the outer end of the drive shaft, a gear housing supported on the upper wall portion of the tube and into which the inner end of said drive shaft extends, a belt pulley rotatably supported on said housing, gear connections between the pulley and the inner end of said drive shaft within the housing, a frame depending from the tube and pivotally connected to said housing, a motor supported within said frame, and a drive belt connection between said pulley and said motor.

2. The structure according to claim 1, wherein said tube is provided with a hopper at its feed-in end, elongated openings in the bottom wall of the tube adjacent said hopper, and screen elements removably disposed within said openings, together with an elongated pan disposed beneath said screen elements and slidably disposed on said channel members.

References Cited in the file of this patent

UNITED STATES PATENTS

| | | |
|---|---|---|
| 988,095 | Hango | Mar. 28, 1911 |
| 1,048,124 | Ashworth | Dec. 24, 1912 |
| 2,279,201 | Kozak et al. | Apr. 7, 1942 |
| 2,408,952 | Raney | Oct. 8, 1946 |
| 2,424,810 | Escher | July 29, 1947 |
| 2,528,917 | Slocum | Nov. 7, 1950 |
| 2,615,560 | Robinson | Oct. 28, 1952 |

OTHER REFERENCES

Kent's Mechanical Engineer's Handbook, Tenth Edition (1923), by Robert T. Kent, page 569. (Copy available in Division 4.)